United States Patent [19]

Winkler

[11] 4,269,289

[45] May 26, 1981

[54] RETARDER

[75] Inventor: Peter S. Winkler, Birmingham, Mich.

[73] Assignee: Eaton Corporation, Cleveland, Ohio

[21] Appl. No.: 38,026

[22] Filed: May 10, 1979

Related U.S. Application Data

[63] Continuation of Ser. No. 847,512, Nov. 1, 1977, abandoned.

[51] Int. Cl.³ ............................................. F16D 65/84
[52] U.S. Cl. ............................... 188/71.6; 188/264 D; 188/264 E; 192/113 B
[58] Field of Search ............... 188/71.6, 264 R, 264 B, 188/264 D, 264 E, 264 P; 192/113 B

[56] References Cited

U.S. PATENT DOCUMENTS

| | | | |
|---|---|---|---|
| 2,890,769 | 6/1959 | Hause | 188/264 E |
| 2,928,504 | 3/1960 | Hahn et al. | 188/71.6 |
| 2,968,368 | 1/1961 | Schjolin et al. | 188/264 E |
| 3,033,329 | 5/1962 | Malloy | 188/264 P |
| 3,580,369 | 5/1971 | Heck | 188/264 E |
| 3,722,645 | 3/1973 | Sommer | 192/113 B |
| 4,061,207 | 12/1977 | Ahlen | 188/264 E |

FOREIGN PATENT DOCUMENTS

| | | | |
|---|---|---|---|
| 603118 | 8/1960 | Canada | 188/264 P |
| 1445105 | 8/1976 | United Kingdom. | |

Primary Examiner—Edward R. Kazenske
Attorney, Agent, or Firm—R. J. McCloskey; D. Wood; P. Rulon

[57] ABSTRACT

Disclosed is a multiple, wet, friction disc brake adapted for use as a retarder in an unshown drivetrain of a land vehicle. The retarder includes a non-rotating outer housing, a centrally disposed drive shaft extending through the housing and rotatably supported therein by bearings, a plurality of axially moveable stator and rotor brake discs concentrically disposed about the shaft and alternately secured against rotation relative to the non-rotating housing and the shaft, a fluid actuated piston for squeezing the discs together, passage means defined by a portion of the non-rotating housing disposed about the outer periphery of the stator and rotor discs for introducing a pressurized cooling liquid to the outer periphery of the stator and rotor discs and flow grooves formed in the friction sides of the stator discs for the flow of the pressurized cooling liquid radially inward through the grooves.

3 Claims, 2 Drawing Figures

RETARDER

This is a continuation of application Ser. No. 847,512, filed Nov. 1, 1977, now abandoned.

FIELD OF THE INVENTION

This invention relates to a multiple friction disc brake and more specifically to such a brake which is liquid cooled.

DESCRIPTION OF THE PRIOR ART

Multiple friction disc brakes of the liquid cooled type disclosed herein are suitable for use in fixed and mobile installations. The brake herein is configured for use in a land vehicle and is adapted for use as a retarder in such a vehicle.

Some of the more salient problems with brakes of this type include uniform cooling of the discs by the cooling liquid and parasitic energy consumption by the retarder when it is unapplied. Several United States patents teach that more uniform cooling of the discs may be obtained by flowing the cooling liquid radially inward over the discs. However, each of these patents disclose features which cause relatively high parasitic energy consumption either directly or indirectly by the brake.

SUMMARY OF THE INVENTION

An object of the invention is to provide a multiple friction disc brake of the liquid cooled type which is low in direct and indirect parasitic energy consumption.

According to a feature of the invention, the brake includes a non-rotating housing rotatably supporting a drive shaft therein, a plurality of annular stator discs secured against rotation relative to the housing and having grooved oppositely facing friction sides, a plurality of annular rotor discs interleaved with the stator discs and secured for rotation with the shaft and having smooth oppositely facing friction sides, a fluid actuated piston for frictionally interengaging the stator and rotor discs, and cooling liquid passage means defined by a portion of the non-rotating housing disposed about the outer periphery of the stator and rotor disc for introducing a pressurized cooling liquid to the outer periphery of the stator and rotor discs and radially inward through the grooves in the stator discs, whereby direct and indirect parasitic energy consumption of the brake is minimized since the cooling liquid in the passage means of the nonrotating housing and in the grooves of the stator discs is free of centrifugal pumping by the housing and grooves, which centrifugal pumping is a direct energy consumption by the retarder and an indirect energy consumption since the cooling liquid supply pump must operate at a higher pressure to counter the centrifugal pumping.

BRIEF DESCRIPTION OF THE DRAWINGS

The preferred embodiment of the invention is shown in the accompanying drawing in which.

DETAILED DESCRIPTION OF THE DRAWING

Figure 1:
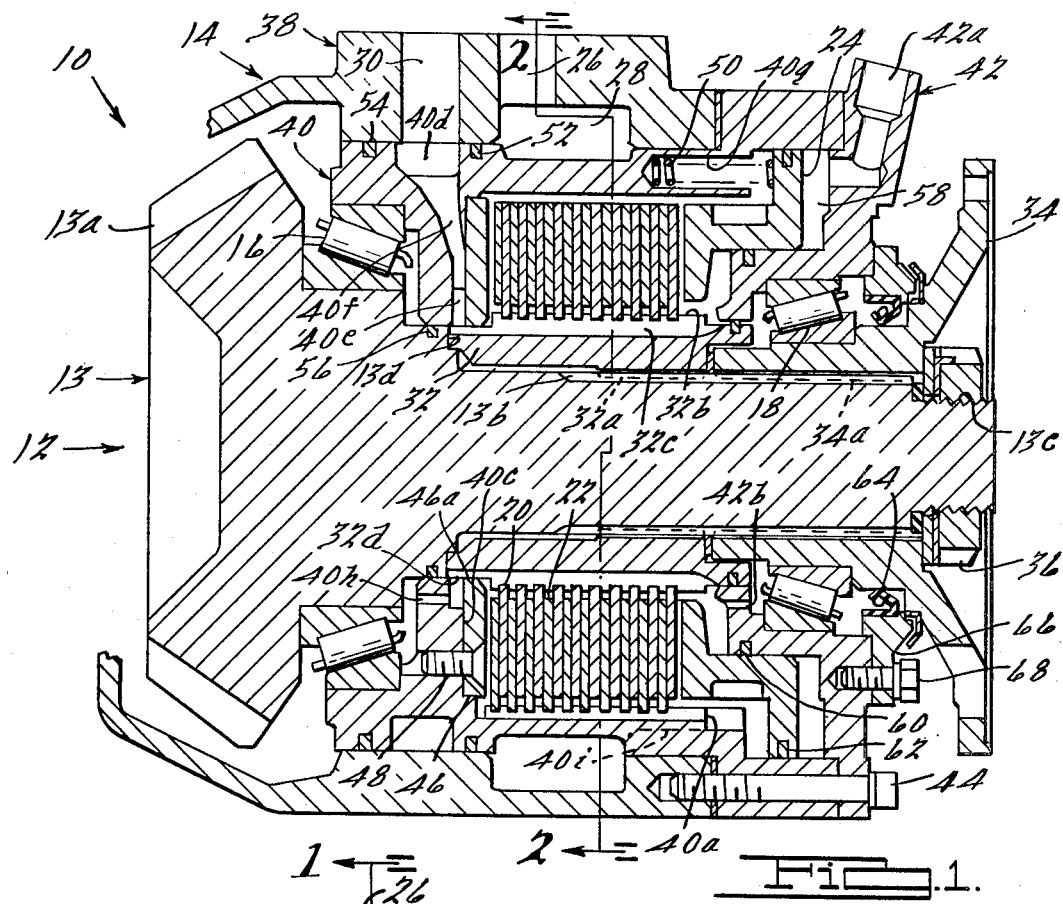
FIG. 1 is an elevational view of a retarder sectioned along line 1—1 of FIG. 2.

Referring now to the drawing, therein is shown a retarder 10 adapted to be interposed between an unshown transmission output and a drive or propeller shaft for a drive axle of a land vehicle. Retarder 10 broadly includes a drive shaft assembly 12 having a through shaft 13 and a beveled input gear portion 13a, a non-rotating or fixed housing assembly 14, a pair of tapered roller bearings 16 and 18 carried by the housing assembly and rotatably supporting and retaining the shaft assembly against axial movement relative to the housing assembly, a set of rotor friction discs 20 axially moveable relative to the housing and ahaft assemblies and fixed to rotate with the shaft assembly, a set of stator friction discs 22 axially moveable relative to the housing and shaft assemblies and fixed against rotation relative to the housing assembly, an annular piston 24 having a generally Z shaped cross section and operative to squeeze the discs into frictional interengagement, an inlet port 26 for introducing a pressurized cooling liquid from an unshown supply pump to an annular area 28 radially outward of the disc sets and defined by the non-rotating housing assembly, and an outlet port 30 for the discharge of the cooling liquid from an area radially inward of the disc sets.

Looking now at the retarder in greater detail, shaft assembly 12 includes through shaft 13, bevel gear portion 13a, a set of splines 13b, a threaded end portion 13c, a generally cylindrically shaped member 32 having internal splines 32a engaging splines 13b, an output member 34 having internal splines 34a engaging splines 13b, and a nut 36 for preventing axial movement of members 32 and 34 in combination with a shoulder portion 13d. Cylindrical member 32 includes a plurality of deep, external splines 32b for slidably retaining the rotor discs against rotation relative to shaft assembly 12 and for providing axially extending flow passages 32c for cooling liquid flowing to outlet port 30 after the liquid has flowed radially inward over the disc sets.

Housing assembly 14 includes a partially shown outer housing member 38, an inner housing support member 40, and an end cover member 42. Members 40 and 42 are secured to the outer housing member by a plurality of bolts 44. The broken away or unshown portion of outer housing member 38 is configured for attachment to a transmission housing at an angle for facilitating a meshing engagement of beveled input gear portion 13a of through shaft 13 with a beveled output gear of the transmission. In a preferred orientation of the outer housing member, the inlet and outlet ports 26 and 30 are positioned above the maximum height of the friction discs to insure total flooding of the disc sets by cooling liquid. Of course, this flooding effect can be obtained by placing only the outlet port high or by placing a portion of an unshown outlet line high.

Inner housing member 40 includes a plurality of axially extending notches or internal splines 40a for slidably retaining the stator discs against rotation, a plurality of circularly arrayed passages 40b (FIG. 2) directing cooling liquid from annular area 28 to the outer periphery of the disc sets, an end portion 40c providing support for an annular reaction ring 46 secured by a plurality of countersunk screws 48, an outlet passage consisting of annular grooves 40d for communicating passages 32c with outlet port 30, and a plurality of circularly array blind bores 40g retaining springs 50 which bias piston 24 to the deactuated position away from the friction disc sets. Annular groove 40d is sealed from annular area 28 and the housing area containing bevel gear portion 13a via ring seals 52 and 54. Annular groove 40e is sealed from the housing area containing bearing 16 via a ring seal 56. A bleed passage 40h allows a small amount of cooling liquid to flow into the area containing bearing 16 for lubricating the bearing. This lubricating liquid is drained from the housing area containing the bevel gear via an unshown return passage. To insure an even distribution of cooling liquid to the outer periphery of the disc sets, passages 40b flare out to the right (see hidden line 40i in FIG. 1) so that the outlet of liquid therefrom extends the axial extent of the disc sets.

The inside diameter 46a of annular reaction ring 46 extends radially inward beyond the inside diameter of disc sets 20 and 22 and into a necked down portion 32d of deep splines 32b adjacent to annular outlet groove 40e. This arrangement forces the flow of cooling liquid in flow passages 32c radially inward beyond the disc sets and tends to even out the radial inflow distribution of cooling liquid from the disc sets along the axial extent of passages 32c.

End cover member 42 in combination with housing member 40 and piston 24 defines an annular chamber 58 for applying pressurized fluid via a fluid inlet port 42a to actuate or move piston 24 to the left and frictionally squeeze the disc sets together against the reaction provided by reaction ring 46. Annular chamber 58 is sealed by ring seals 60 and 62. A bleed passage 42b allows a small amount of cooling liquid into the area containing bearing 18 for lubricating the bearing. This area is drained by an unshown drain passage and is sealed at its rightward end by a seal 64 carried by an annular ring 66. Ring 66 is secured to end cover member 42 via a plurality of bolts 68.

An important feature of the instant retarder relates to the fact that annular area 28 and passages 40b are formed by non-rotating members of the housing to negate centrifugal pumping or rotation of the cooling liquid rather than being formed in a rotating housing, which rotating housing would tend to pump or impart a radially outward pressure to the cooling liquid, thereby requiring a pressure increase of the cooling liquid with a resultant energy consumption increase by the supply pump presurizing the cooling liquid. This energy consumption is in effect a parasitic energy consumption caused by the design of the retarder.

Figure 2:
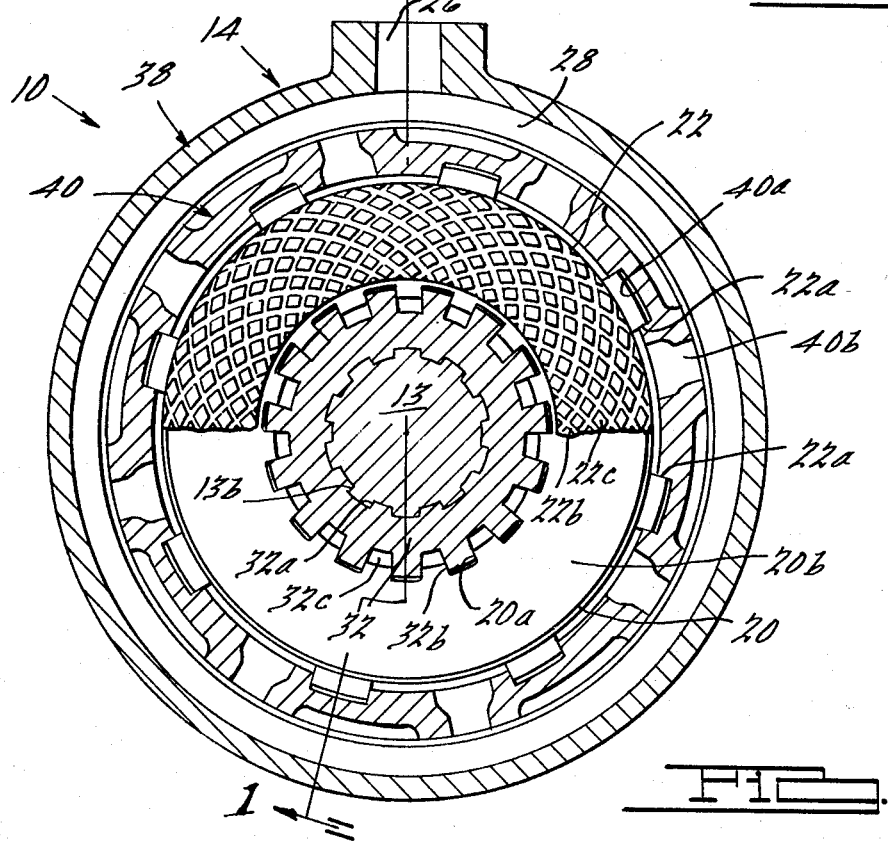
FIG. 2 is a sectional view of the retarder taken along line 2—2 of FIG. 1.

Referring now mainly to FIG. 2 which shows half of a rotor disc and half of a stator disc, rotor discs 20 are each annular in shape and are each retained for rotation with shaft assembly 12 via internal splines 20a which slidably receive splines 32b of member 32. Further, each rotor disc is formed with smooth oppositely facing friction sides 20b to minimize centrifugal pumping and rotation of the cooling liquid by the discs rather than with cooling liquid flow grooves which would tend to pump and rotate the cooling liquid. Such pumping of the cooling liquid directly increases the parasitic energy consumption of the retarder and in the instant retarder such pumping and rotation opposes radial inflow of the cooling liquid, whereby the pressure of the cooling liquid must be increased with a resultant indirect energy consumption increase by the supply pump pressurizing the cooling liquid.

Stator friction discs 22 are each annular in shape, are each retained against rotation relative to housing assembly 14 via external splines 22a which slidably receive splines 40a of housing member 40, and are each provided with a plurality of grooves 22b on their oppositely facing friction sides 22c. Grooves 22b in combination with smooth sides 20b of the rotor discs provide stationary passages which allow the flow of cooling liquid radially inward over the discs from non-rotating area 28 and passages 40b into deep splines 32c.

The preferred embodiment of the invention has been disclosed for illustration purposes. Many variations and modifications of the preferred embodiment are believed to be within the spirit of the invention. The following claims are intended to cover the inventive portions of the preferred embodiment and variations and modifications believed to be within the spirit of the invention.

What is claimed is:

1. In a brake of the type including a non-rotating housing and drive shaft means rotatably disposed therein; an annular set of rotor discs secured for rotation with said shaft means, said rotor discs having oppositely facing friction sides; an annular set of stator discs secured against rotation relative to said housing and interleaved with said rotor discs, said stator discs having oppositely facing friction sides; means for selectively squeezing the friction sides of said disc sets together to inhibit rotation of said shaft relative to said non-rotating housing; the improvement comprising:

passage means defined by a portion of said non-rotating housing circumferentially disposed about the outer periphery of said rotor and stator discs for porting a pressurized cooling liquid to the outer periphery of said rotor and stator discs;

flow passages for directing said cooling liquid radially inward between said rotor and stator disc sets, said flow passages defined by smoothly forming said friction sides of said rotor discs and by grooving said friction sides of said stator discs;

a plurality of internal splines defined on the inside diameter of said rotor discs;

a pluratlity of external splines defined by said shaft means and slideably receiving said internal splines for rotatably securing said set of rotor discs to said shaft means, said external splines having a depth in excess to the radially inwardly projecting extent of said internal splines for forming axially extending flow passages directly substantially all of said cooling liquid from said disc sets to an outlet port; and an annular ring disposed at an outlet end of said axially extending flow passages, said ring extending radially inward beyond the radially inward extent of said disc sets for forcing the outlet flow from said axially extending flow passages radially inward beyond the radially inward extent of said disc sets to improve the cooling liquid flow distribution from said disc sets into said axially extending flow passages.

2. In a device for inhibiting rotation between two relatively rotatable members; said device including a housing; shaft means rotatably disposed within said housing; first and second sets of interleaved friction discs having oppositely facing friction sides, said discs respectively secured against rotation relative to said housing and shaft means; means for selectively squeezing said disc sets together to inhibit rotation of said shaft means relative to said housing; and flow passages defined by said housing; and circumferentially disposed about the outer periphery of said disc sets for directing cooling liquid radially inward through flow passages defined by said discs; the improvement comprising:

a plurality of internal splines defined on the inside diameter of said second set of discs;

a plurality of external splines defined by said shaft means and slideably receiving said internal splines for rotatably securing said second set of discs to said shaft means, said external splines having a depth in excess to the radially inwardly projecting extent of said internal splines for forming axially extending flow passages directing substantially all of said cooling liquid between an end of said shaft means and said disc sets; and an annular ring disposed at an outlet of said axially extending flow passages, said ring extending radially inward beyond the radially inward extent of said disc sets for forcing the outlet flow from said axially extending flow passages radially inward beyond the radially inward extent of said disc sets to improve the cooling liquid flow distribution from said disc sets into said axially extending flow passages.

3. The device of claim 2, wherein said flow passages defined by said disc sets are defined by smoothly forming the friction sides of the discs secured to said shaft means and by grooving the friction sides of said discs secured to said housing.

* * * * *